(No Model.)

A. B. FOANS.
REVERSIBLE HOSE NOZZLE AND COUPLING.

No. 450,452. Patented Apr. 14, 1891.

WITNESSES
Jas. B. Martin
Frank Pearson

INVENTOR
Andrew Butler Foans

UNITED STATES PATENT OFFICE.

ANDREW B. FOANS, OF NEW YORK, N. Y.

REVERSIBLE HOSE NOZZLE AND COUPLING.

SPECIFICATION forming part of Letters Patent No. 450,452, dated April 14, 1891.

Application filed May 6, 1890. Serial No. 350,841. (No model.)

*To all whom it may concern:*

Be it known that I, ANDREW B. FOANS, a citizen of the United States, residing in the city, county, and State of New York, have invented a new and useful Improvement in Reversible Hose Nozzles and Couplings, which will be more particularly hereinafter described, and summed up in the claim.

This invention relates to that class of devices which is designed to be used as a hose nozzle and coupling having the usual stop-cock therefor and female screw at one end, and in addition thereto a tapering screw at the other end, also forming the nozzle, so that it may be reversed and the tapering end inserted in the hose and the larger screw-threaded end used as a coupling for hose-sections or in connection with a sprinkler.

Figure 1:
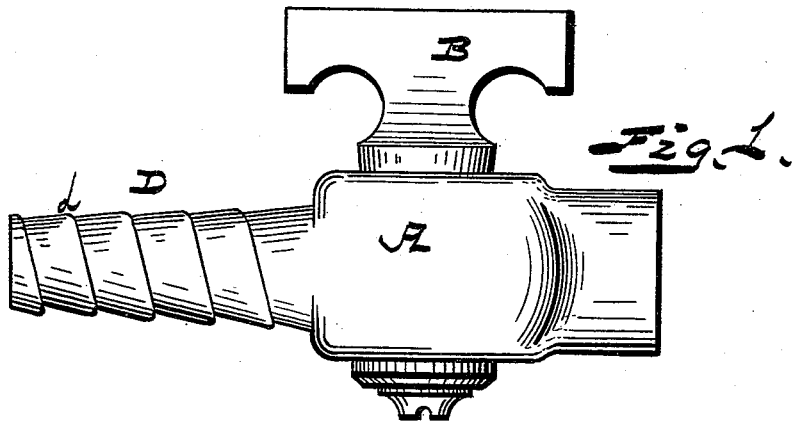
Figure 2:
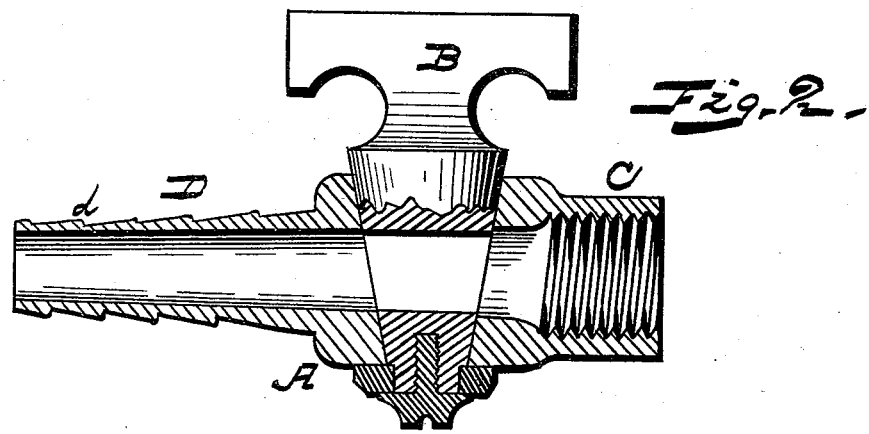
Figure 3:
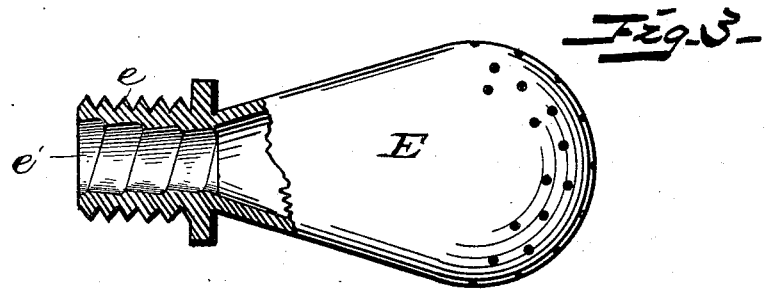

Referring to the drawings which form a part of this specification, Figure 1 is a longitudinal elevation of my improved nozzle and coupling. Fig. 2 is a central longitudinal section of the same; and Fig. 3 is an elevation, partly in section, showing my improved sprinkler, which is used in connection with the coupling.

In the drawings, A represents my improved coupling and nozzle having the stop-cock B of any preferred construction.

C represents the larger or coupling end of the device, showing it in this instance provided with a female screw-thread.

D represents the nozzle portion of the same, which is, for obvious reasons, of less diameter than the opposite end. It is provided with a male screw-thread *d* of slow pitch—say three-eighths to half an inch—and with round threads, that it may not injure the hand when used as a nozzle or the hose when it is socketed therein.

The sprinkler E (shown at Fig. 3, and which forms a part of this invention) is pear-shaped and terminates in a rose of hemispherical form and having the usual perforations therein. The opposite smaller end has a male screw-thread *e* thereon to adapt it to the threads of the coupling C and an interior or female screw *e'* to adapt it to the male of the coupling. The nozzle end of the coupling, it will be observed, is tapering and screw-threaded, so that should it be desirable to insert this end into the hose the threads will take hold of the material without injuring it, and as it advances the larger part of the taper will be forced tightly into the hose and the thread will bind it there and so hold it that the pressure of the water cannot force it out. By this arrangement the screw-collar or wire binding may be dispensed with and a saving thus effected, and in addition to this the device may be easily attached and detached without the aid of tools or material. When used in this manner, the sprinkler may be applied and used as a part of the entire structure, and again the device may be used as one section of the hose-coupling, with the advantage of having the stop-cock thereon. By this means the water could be shut off at any one of the joints of the separate lengths of the hose, and this would be desirable in case of a sudden rupture anywhere along the same.

Having thus fully described my invention, what I claim as new, and desire to secure by Letters Patent, is—

A combined hose nozzle and coupling having an interposed stop-cock and an internally-screw-threaded section, the opposite section thereof tapering in the form of a nozzle and having along the exterior surface a spiral corrugation for engagement with the interior surface of hose to serve as a coupling therefor, and a rose-sprinkler having its coupling end provided with the usual exterior threads, the interior thereof being reversely corrugated for engagement with the tapering end of the nozzle.

ANDREW B. FOANS.

Witnesses:
  CLARA FOANS,
  ISABELLA E. MAGNER,
  F. D. HARMON.